Nov. 4, 1958 P. ARBEIT 2,859,261
APPARATUS AND METHOD FOR MAKING GLASS
Filed Oct. 1, 1953 3 Sheets-Sheet 1

INVENTOR.
PIERRE ARBEIT
BY
Bauer & Seymour
ATTORNEY

Nov. 4, 1958 P. ARBEIT 2,859,261
APPARATUS AND METHOD FOR MAKING GLASS
Filed Oct. 1, 1953 3 Sheets-Sheet 3

INVENTOR.
PIERRE ARBEIT
BY
Bauer & Seymour
ATTORNEY

United States Patent Office 2,859,261
Patented Nov. 4, 1958

2,859,261

APPARATUS AND METHOD FOR MAKING GLASS

Pierre Arbeit, Paris, France, assignor to Societe Anonyme des Manufactures des Glaces et Produits Chimiques de Saint-Gobain Chauny & Cirey, Paris, France Application October 1, 1953, Serial No. 383,636

Claims priority, application France May 16, 1950

21 Claims. (Cl. 13—6)

This invention is a continuation-in-part of my application Serial No. 225,709 filed May 11, 1951, and now abandoned.

This invention relates to furnaces for melting materials such as in particular furnaces for the production of glass or other vitreous materials. The invention particularly concerns improvements in furnaces operating at least in part by Joule effect by means of electrodes immersed in the fused bath.

It is an object of the invention to improve the operation of furnaces heated by Joule electrodes immersed in the glass or other materials undergoing treatment. The improvement is achieved by obtaining improved control of the motion of the glass by obtaining an improvement in the application of Joule effect heat, by an improvement in furnace structure, and by an improvement in electrodes.

Another object is to solve the difficult problem of mounting an electrode in a furnace wall for continuous rotation. It is known that electrodes can be mounted in furnace walls with the ability to slide them in and out, but such motion has been imparted to such electrodes only briefly, and after considerable intervals of time, for instance, after long use, when an electrode has worn down and must be extended further into the furnace, remaining fixed through most of its life. It has been proposed to seal the shaft of a rotating electrode in molten tin, or the like (Serial No. 225,708, filed May 11, 1951), but this structure is complex and relatively costly.

It is an object of the invention to mount electrodes in the walls of furnaces for continuous rotation, particularly in the walls of glass furnaces, without weakening the walls, without permitting leakage of the contents around the rotating electrode, and with a maximum of durability, and a minimum of expense.

These several improvements are combined in a new process and new furnace of increased flexibility and improved performance.

The improvement in the application of Joule effect heat is obtained by means of at least one vertical or substantially vertical electrode, of improved design, having a variation of its section capable of modifying the distribution of the current lines in the zone of the bath comprised between this electrode and the other cooperating electrode, or electrodes. According to the invention, it is possible to give to such an electrode a rotary motion around its axis. In the accompanying drawings are shown embodiments of the principles of the invention as applied to glass furnaces, wherein the invention has its most useful and important application, and with respect to which it will be described.

The invention relating to the obtaining of improved control of the glass is obtained, generally speaking, by continuously rotating one or more of the electrodes used to heat the bath around its vertical axis, thereby imparting increased mobility to the glass and establishing a greater responsiveness of the glass to the heating imparted to it, for instance, by setting up strong convection currents while giving a desired direction to those currents.

It has already been proposed to mount graphite electrodes in the wall of a furnace by a graphite sleeve so that the electrode may be pushed in, or pulled out of the furnace as needed.

The present invention has as an object to mount a rotating member, such as a rotating agitator, or a rotating electrode, or a rotating member which is both an agitator and an electrode, in the wall of a furnace for treating glass or analogous materials. This mounting comprises a graphite sleeve which penetrates through at least a part of the thickness of the furnace wall, and serves as a bearing for the rotating member.

The rotating member may be composed wholly of graphite and in such case it is mounted in the bearing with a bearing fit, or with only such tolerance as is permitted in bearing practice. On the other hand, when the rotating member is metal, or other refractory material than graphite, the part of the rotating piece which engages the encircling bearing should be provided with a graphite sleeve which fits snugly over it, and to the graphite bearing.

In the preferred form of the invention, the bearing sleeve which is mounted in the wall of the furnace is encircled by a cooling device, such as a water jacket, which also extends, at least partly, into the wall. It has been demonstrated that under these conditions, the bearing sleeve in the wall, and bearing surface of the electrode, form a tight joint through which the glass will not escape, and that it is unnecessary to employ a molten metal to seal the joint between the two pieces.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims. In particular, the mounting of the rotating member according to the invention may be provided through a lateral wall of the furnace as well as through the bottom wall.

In the drawings, wherein like reference characters refer to like parts throughout the several views, Fig. 1 is a vertical cross section on line 1—1 of Fig. 2 through the tank of an electric heated glass furnace taken through the lump;

Figure 1:
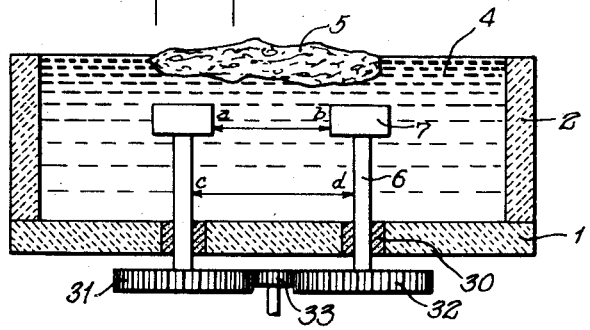
Figure 2:
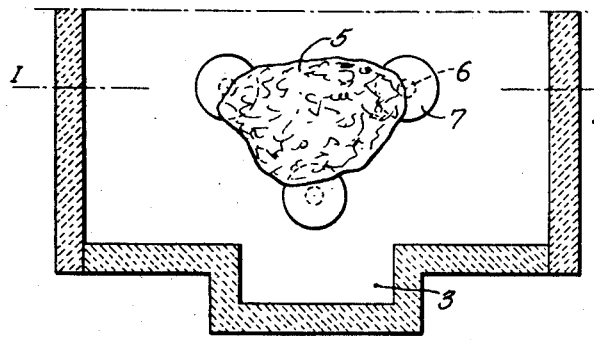
Fig. 2 is a plan view of the structure sectioned in Fig. 1.

In the furnace of Figs. 1 and 2, the upper part of the furnace above the glass level, including the dome and flame ports for flame heating which may or may not be associated with the electric heating is omitted, but should be deemed to be present and of ordinary construction. The tank has a sole 1, longitudinal sides 2, and is filled with glass 4, upon which floats a lump 5 of the raw materials of which glass is made, the section being taken through the furnace in the melting zone.

Beneath the lump are arranged a triangle of cylindrical rod electrodes 6, entering through bearings 30 in the sole of the furnace. The bearings may be for example made of carbon or the form of carbon called graphite.

The rod electrodes 6 shown in Figs. 1 and 2 present according to the invention a variation of their transverse section which, in this example, is constituted by an enlarged head 7 having a substantially greater diameter than the rod; the diameter of the head is such that the distance ab between the heads of two adjacent electrodes is notably smaller than the distance cd between the rods themselves. Due to the particular form of these new headed electrodes, the electrical energy dissipated through each unit volume of the glass between the heads of the electrodes will be greater than that dissipated through the unit volume of glass between the rods themselves. In such a case, the layer of glass situated between the heads of the electrodes will be brought to the highest temperature. Thus, there will be established, owing to the invention, at any selected level, an upward glass current resulting from the fact that the glass at the selected level is brought to a higher temperature and tends to move upwardly. This upward current may be used for different purposes. In particular, in the melting zone, it may act to heat from beneath the mass of raw materials floating on the bath and consequently to accelerate their melting.

Figure 6:
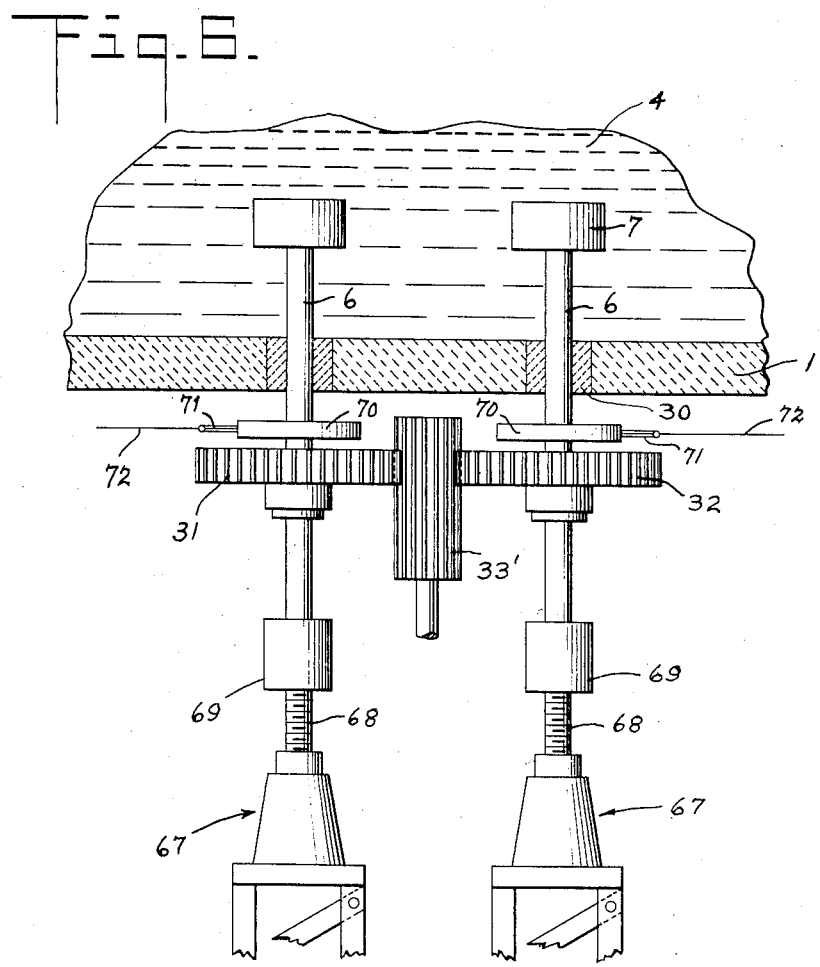
Fig. 6 is a view partially in vertical section and partially in elevation of apparatus similar to that of Figs. 1 and 2, Fig. 6 showing mechanism for adjusting the electrodes vertically and for supplying electric current to the electrodes.
Figure 7:
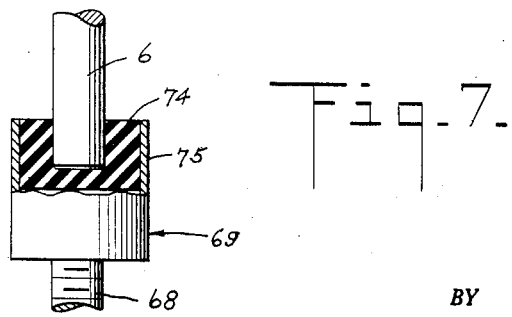
Fig. 7 is a fragmentary view, partially in vertical section and partially in elevation, of a portion of the electrode adjusting mechanism shown in Fig. 6.

The electrodes 6—7 are vertically adjustable, the mechanism for which is shown in Figs. 6 and 7 and which will be described hereinafter, and the enlargements 7 succeed in concentrating the current in their own plane, horizontally if all the parts 7 are horizontal, or tilted if some of the heads are up and others down. This permits the furnace man to arrange the center of heat as a plane at any desired level in the furnace, and to bring it close to the sole while concentrating it at a level out of contact with the sole. It establishes a hot zone of selected depth, and makes it possible to bring the new zone of known depth near the base of the mass of raw materials floating on the surface of the bath in order to produce a rapid fusion of the lower layers of the mass of raw materials.

The rod electrodes 6 may be mounted rotatably in the bearings and have gears 31—32 attached to their outer parts; both the gears of Fig. 1 are driven by a gear 33 as illustrated, but by appropriate drive arrangements at any part, one or more, or none, of the electrodes may be driven at any selected time.

The driving of the electrodes has an unexpected and astonishing effect of accelerating the rate of manufacture and of improving the effectiveness of heating by Joule effect. This effect is enhanced by the form of electrode shown in the figures, which has an enlarged head 7, of about thrice the width of the rod 6. These new headed electrodes have yet another function in that they enable to locate a plane of concentration of the Joule effect power at a selected level equally remote from the walls and selectably near the surface or the sole.

Figs. 6 and 7 how mechanism whereby the electrodes of the apparatus of Figs. 1 and 2 are adjusted vertically, and whereby they are supplied with electric current. In such figure the same reference characters are employed to designate parts which are similar to those in Figs. 1 and 2.

Pinion 33' is made sufficiently long to allow gears 31, 32, on the bottom ends of shafts 6, to remain in mesh with the pinion throughout the range of vertical adjustment of the electrodes. Each electrode is adjusted vertically through the medium of a jack-like device 67, the screw shaft 68 of which is connected to shaft 6 below gear 31 or 32 by a bearing 69 rotatably mounted on the upper end of screw shaft 68 and capable of sustaining thrust in either an upward or a downward direction.

Each electrode is supplied with electric current through a slip ring 70 connected to the respective shaft 6, the slip ring being supplied with electric current through a brush 71 contacting slip ring 70, the brush in turn being connected to a cable 72 from a source of electric current, not shown. Each bearing 69 includes an insulating means connecting the bearing to its shaft 6. Such means includes an insulating cup-like member 74 which is interposed between the upper end of the shell 75 of bearing 69 and the lower end of shaft 6, member 74 connecting the shaft and bearing for joint rotation and reciprocation.

Figure 3:
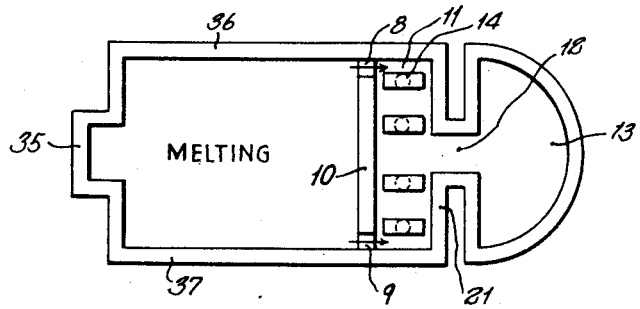
Fig. 3 is a plan view of a furnace embodying the new principles.

The furnace of Fig. 3 has a tank with doghouse 35 through which the solids are admitted, side walls 36, 37, and a cross wall 10 extending up from the bottom above the glass level, except at its ends where channels 8—9, preferably narrow as shown, and shallow, are provided for the flow of glass from the melting to the fining compartment 11. In the fining compartment headed electrodes 14 are provided with oblong heads, being otherwise like those of Fig. 2. However, these headed electrodes may be depended if desired, entering the bath from above and being raised or lowered through appropriate bearings in the dome. The glass, as it flows past these electrodes is raised to fining temperature. The oblong headed electrodes have a dimension almost as long as the fining chamber 11 is wide in order that the current lines may be distributed over a greater area. These electrodes 14 may be rotated. When they rotate they continually change the concentration of current, between the heads but not between the rods, and when they are still they may be positioned to produce varied and valuable current patterns at different depths.

Fining is that part of glassmaking in which the crude melt is raised in temperature to complete reactions, melt highly refractory particles, and eliminate occluded gases and seeds. The temperature of fining is on the order of 1450° C.

In this furnace, of Fig. 3, the working zone 13 is a separate tank connected to the main tank by a passage 12 through which the fined glass makes its way.

Working is that part of glassmaking in which the hot fluid glass is taken from the fining zone and cooled to a temperature and viscosity satisfactory for shaping as articles. It has an additional function of reabsorbing the small bubbles that have not been capable of escaping during fining.

The fining zone 11 may be of small dimensions because of the particular arrangement and novel construction of the furnace and its electrodes and the novel method of operation.

Figure 4:
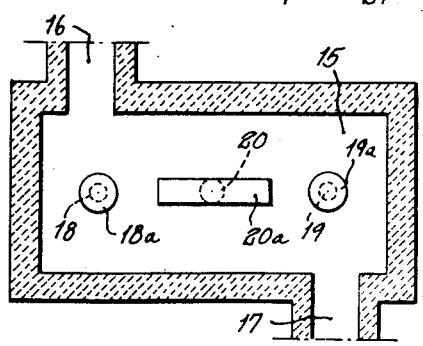
Fig. 4 is a horizontal section through the fining zone of another glass furnace of new design.

In Fig. 4 is another example of a fining compartment with another arrangement of electrodes. In this case channel 16 brings glass in from a melting chamber at the side of fining chamber 15, and channel 17, at the opposite side and in remote position, takes the fined glass to the working or to a conditioning chamber. The electrodes 18—19 have heads 18a—19a and may be fixed or rotating. Electrode 20 has a head 20a which may be fixed or rotating, but preferably rotates so as to modify the distribution of the Joule effect current lines at the level of the head, to vary the extent of the heated area and also to cause a stirring of the bath of this level, thus contributing to a greater homogeneity of the glass.

In Fig. 1, a graphite electrode 6 extends rotatably through a graphite bearing sleeve 30 which is mounted in the sole of the furnace. The inner and outer members 6, and 30, have a bearing fit, and the joint between them remains tight without permitting leakage of glass, even after a long period of service.

Figure 5:
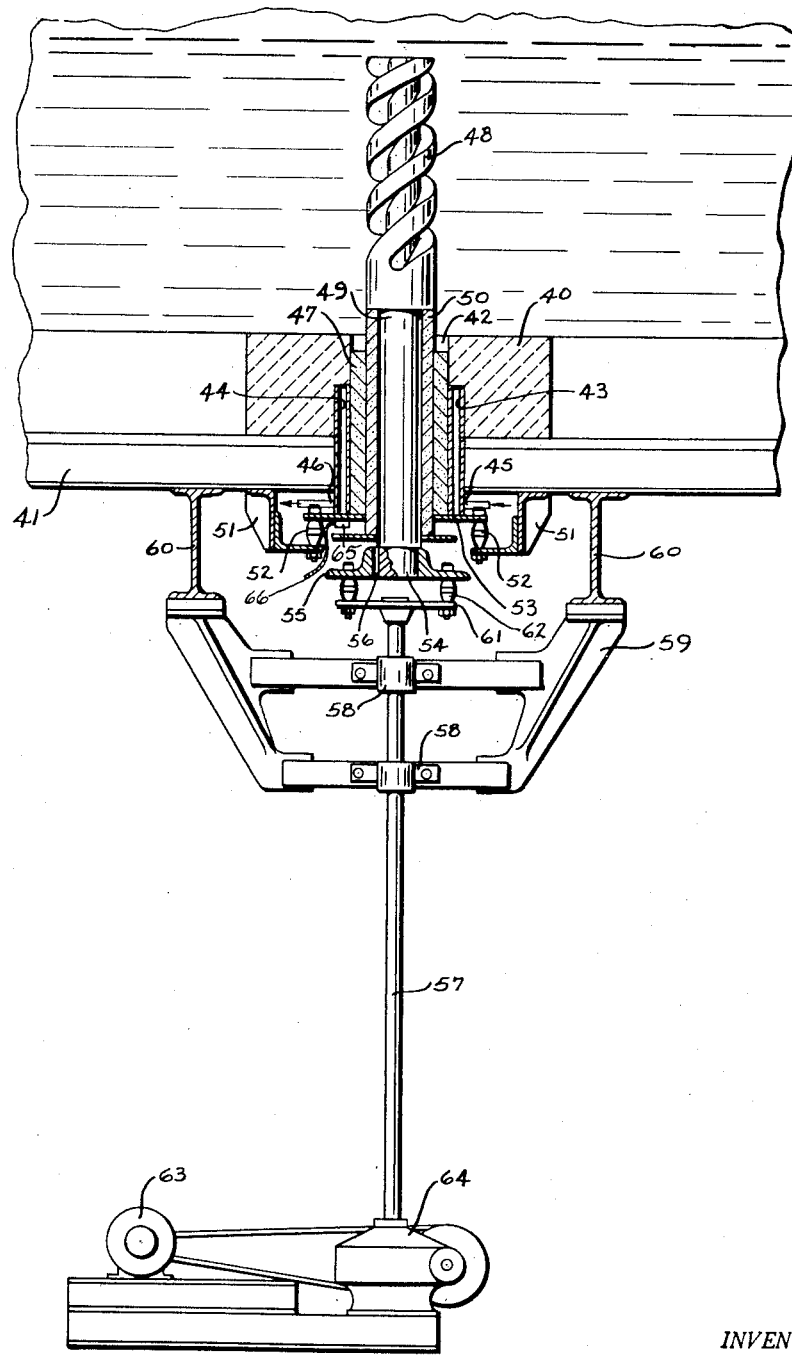
Fig. 5 is a vertical section, partly elevational, through the best form of the invention, pertaining to the mounting of a rotating agitator in the bottom of the glass furnace.

In Fig. 5 is shown a preferred form of the invention relating to the mounting of a rotating electrode, or impeller, or the like. The structure disclosed in Fig. 5 can be used to rotate any of the electrodes shown in Figs. 1–4 and 6, or it may be substituted in its entirety for any of such electrodes and their bearings and driving means. In this figure, 40 indicates a part of the sole, or bottom wall of the furnace, which is composed of refractory brick supported upon a bridge-work of metal beams 41. The portion of the wall shown in section has a circular hole 42 entering from above, and a larger hole 43 entering from below, forming an aperture extending through the wall in which the novel mounting is seated.

The mounting includes a water jacket 44 having inlet 45, and outlet 46. This jacket is set in the hole 47, and holds within it a carbon, preferably graphite, sleeve 47, which extends into the hole 42 and forms a tight joint therewith. A refractory metal impeller 48 has a shaft 49 extending through the bearing 47, and this shaft is tightly encircled by graphite sleeve 50 which has a bearing fit with the bearing sleeve 47. A pair of supports 51 carry adjustable sleeve supports 52 upon which is mounted a plate 53 which supports the bearing 47 against the weight of the glass in the furnace. The shaft 49 of impeller 48 is reduced at its lower end 54 and is keyed to a support 55 by key 56. The support 55 is a flanged rim upon which the shoulder between 49 and 54 rests. A driving shaft 57 is supported in bearing 58 in a yoke 59 carried by support 60. Shaft 57 has a driving disk 61 at its upper end connected by an adjustable screw connection 62 to the flange of member 55. The lower end of shaft 57 receives power from an electric motor 63, and a speed reduction gear 64. If desired, the impeller 48 can be electrified to serve as an electrode by attaching a source of current to it. A lug 65, having a cable 66 connected thereto, is shown attached to the plate 53. Cable 66 is attached to a suitable source of current supply, not shown.

When rotating the electrodes according to the invention may also serve as agitators; they tend to produce a more homogeneous glass. In all cases, the enlargement which may be at the head of the electrode serves to increase the quantity of heat liberated per unit volume of the bath in that part which is between the enlargement and the associated electrodes. Another improvement results from the fact that the enlargement increases the area of the bath reached by the lines of electric current.

Due to the invention, an ascending current is initiated in any chosen level as that level may be raised to a higher temperature than the remainder of the glass, expands and rises because of its acquired lower density, and also because of the stirring action of the electrodes when they rotate, which seem to activate the glass and overcome its inertia. This rising current can be used for different purposes, for instance, in the melting zone to attack the lump from below, and in the fining zone to increase the rate of fining and to release gases more fully, more quickly, and to improve homogeneity of the glass. The invention is particularly valuable in furnaces having a plurality of heating means, for instance, flame and Joule effect, as the elevation of the lower levels of the glass to the surface, where they are additionally heated by flame, and radiation from the vault is accomplished with materially greater efficiency.

Rotation of the electrodes not only activates and agitates and homogenizes the glass, but displaces the path of current through the glass, a fact which can be employed with great advantage, particularly in the making of high quality glass.

The action of the electrodes can be restricted, if desired, to particular quantities of glass by the use of walls and baffles, of which wall 10 and baffles 21 of the furnace of Fig. 3 are illustrative. The electrodes can be applied to discontinuous as well as to continuous furnaces.

It is regarded as astonishing that this simple construction should suffice to prevent the escape of glass around a rotating electrode-like body at furnace temperature without excessive friction, and rapid wear.

It is part of the invention that the effect of an electrode, which tends to set up motion in the glass in a certain direction, is increased by imparting a rotational effect to the glass acted upon by such source.

The flexibility of the new glass furnaces is greatly superior to that of older types and that flexibility, that increased capacity to meet the demands of more widely varying conditions arising in the plant, can be further increased by changes in the shape, or the location on the electrode, of the enlargements, and by the nature and characteristics of the current or currents imposed upon them.

As many apparently widely different embodiments of the present invention may be made without departing from the spirit and scope thereof, it is to be understood that the invention is not limited to the specific embodiments.

What is claimed is:

1. A glass furnace of continuous flow type including a tank having side walls, a melting zone ending in a wall joining the side walls, said wall generally extending above the glass level but having shallow surface channels permitting glass to flow out of the melting zone near the side walls, a fining zone extending between the side walls adjacent said wall, a working zone constituted by a separate tank connected to said fining zone by a narrow channel remote from the side shallow channels, a plurality of rod electrodes extending upward through the bottom of the fining zone, said electrodes having horizontally disposed, oblong tops of an extent approaching the width of one dimension of the fining zone and located near the level of the said surface channels, means to supply said electrodes with current of fining intensity, and means to rotate said electrodes.

2. The method of making glass that comprises subjecting it to the passage of Joule effect current of constantly changing area and intensity.

3. A furnace for the manufacture of glass comprising a tank along which the glass flows continuously from end to end, a transverse wall separating the fining zone from the melting zone of the tank, a small shallow channel connecting the fining zone with the melting zone at one side of the wall, a duct connecting the fining zone with the working zone at a point laterally distant from the said channel so that the glass flows across the fining zone from channel to duct, electrodes in the fining zone positioned to be successively passed by the flowing glass in the fining zone, and means to rotate the electrodes in contact with the glass.

4. Means for concentrating electric current and heating effect in the glass at a selected level of a glass furnace comprising electrodes extending upward in the glass from the bottom of the furnace, means to pass electric current of heating intensity between the said electrodes, at least one said electrode including a stem extending vertically through the bottom of the furnace and a horizontal projection extending from said stem substantially parallel to the bottom of the furnace, means to change the vertical position of said projection in the glass, and one of said electrodes having an oblong projection and another having a symmetrical projection, and means to rotate the electrode with the oblong projection.

5. A glass furnace of continuous flow type including a tank having side walls, a melting zone ending in a wall joining the side walls, said wall generally extending above the glass level but having shallow surface channels permitting glass flow out of the melting zone near the said walls, a fining zone extending between the side walls adjacent said wall, a separate working zone connected to said fining zone by a narrow channel remote from the side channels, a plurality of rod electrodes extending upward through the bottom of the fining zone, said electrodes having horizontally disposed, rotatable, oblong tops of an extent approaching the width of one dimension of the fining zone and located near the level of the said surface channels, and means to supply said electrodes with current of fining intensity.

6. A glass furnace of continuous flow type including a tank having side walls, a melting zone ending in a wall joining the side walls, said wall generally extending above the glass level but having shallow surface channels permitting glass flow out of the melting zone near the side walls, a fining zone contiguous to said wall, a separate working zone connected to said fining zone by a narrow channel remote from the side channels, a plurality of rod electrodes extending upward into the glass from the bottom of the fining zone, a said electrode having an oblong horizontally disposed top, having a length approaching the width of one dimension of the fining zone, and means to rotate the electrode with the oblong top.

7. Apparatus for the manufacture of glass comprising a furnace tank adapted to receive glass, a pair of electrodes having parallel stems extending upward into the glass from the bottom of the tank, said electrodes having enlarged heads extending laterally beyond the stems toward each other so that the distance between the heads is less than the distance between the stems, means to connect the said electrodes to the same source of electric current, means to rotate the electrodes, and means to move the electrodes axially.

8. Apparatus for the manufacture of glass comprising a furnace tank adapted to receive glass, a pair of electrodes having parallel stems extending upward into the tank beneath the glass level from the bottom thereof, at least one said electrode having a head extending laterally beyond the stem toward the other of said pair whereby to reduce the distance through which electric current must flow at the level of the head, means to connect the said electrodes to the same source of electric current, and means to rotate the headed electrode.

9. Apparatus for the manufacture of glass comprising a furnace tank adapted to receive glass, a pair of electrodes having parallel stems extending upward into the tank beneath the glass level thereof from the bottom thereof, at least one said electrode having a head extending laterally beyond the stem toward the other of said pair whereby to reduce the distance through which electric current must flow at the level of the head, and means to connect the said electrodes to opposite poles of the same source of electric current.

10. A furnace for the manufacture of glass in which the glass bath is heated at least partly by the passage of an electric current through it, having a tank containing a plurality of substantially vertically extending submerged elongated electrodes with substantially parallel axes, one said electrode having an enlargement extending laterally toward another said electrode a distance sufficient to materially shorten the path of the lines of electric current through the bath at the position of said wider part, and means to move the said enlarged electrode axially.

11. A furnace for the manufacture of glass in which the glass bath is heated at least partly by the passage of an electric current through it, having a tank containing a plurality of submerged elongated electrodes with substantially parallel axes, said electrodes extending into said tank from only one side thereof, and means for connecting said electrodes in pairs to opposite poles of one source of current, one said electrode having an enlargement extending laterally toward another said electrode a distance sufficient to materially shorten the path of the lines of electric current through the bath at the position of said wider part.

12. A furnace according to claim 3 in which a said electrode has an oblong enlargement and another said electrode has a symmetrical enlargement.

13. A glass furnace having a wall, an aperture extending through the wall in a region normally covered by glass, a water jacket engaged with and extending part way through the aperture, a graphite bearing engaged with and extending through the water jacket and engaged with the wall of the aperture beyond the water jacket, a metal impeller extending through the bearing, a graphite sleeve mounted on the impeller and engaging the bearing with a bearing fit, means to drive the impeller, and means to supply water to the water jacket.

14. A glass furnace having a wall, an aperture extending through the wall in a region normally covered by glass, a rotatable shaft extending through the aperture, means to rotate the shaft, and means to mount the shaft tightly and for full rotation in the aperture comprising a graphite bearing face on the shaft, a graphite bearing in the aperture and a water jacket surrounding the bearing.

15. A glass furnace having a wall, an aperture extending through the wall in a region normally covered by glass, a water jacket engaged with and extending into the aperture, a graphite bearing engaged with and extending into the water jacket and engaged with the wall of the aperture, an impeller extending through the bearing, a graphite surface on the impeller engaging the bearing with a bearing fit, means to drive the impeller, and means to supply water to the water jacket.

16. A glass furnace having a wall, an aperture extending upwardly through the bottom wall, a heat exchanger extending into the aperture, a graphite bearing engaged with and extending into the heat exchanger, a rotary rod electrode extending through the bearing into the glass, a graphite surface on the electrode engaging the bearing with a bearing fit, and means to drive the electrode.

17. A glass furnace having a wall, an aperture extending through the wall in a region normally covered by glass, a rotatable shaft extending through the aperture, means to rotate the shaft, and means to mount the shaft tightly, and for free rotation in the aperture comprising a graphite bearing face on the shaft, a graphite bearing engaging the bearing face and mounted in the aperture, and a water jacket surrounding the bearing.

18. A glass furnace having a wall, an aperture extending through the wall in a region normally covered by glass, a rotatable shaft extending through the aperture into the glass, means to rotate the shaft, means to electrify the shaft, and means to mount the shaft tightly, and for free rotation in the aperture comprising a graphite bearing face on the shaft, and a graphite bearing mounted in the aperture, and having a bearing fit with said face.

19. A glass furnace having a wall, an aperture extending through the wall in a region normally covered by glass, a rotatable shaft extending through the aperture into the glass, means to rotate the shaft, and means to mount the shaft tightly and for free rotation in the aperture comprising a graphite bearing face on the shaft, and a graphite bearing mounted in the aperture, and having a bearing fit with said face.

20. A method of making glass that comprises subjecting a glass bath to the action of Joule effect rod-shaped electrodes, said electrodes exchanging current between them through their lateral surfaces and entering the glass bath through a wall beneath the glass level, at least one of the electrodes having a surface immersed in the glass bath which is eccentric to the axis of the electrode, and continuously rotating said one electrode about its axis.

21. A method as defined in claim 20, wherein said eccentric surface is disposed on at least one enlargement on the electrode.

(References on following page)

References Cited in the file of this patent

UNITED STATES PATENTS

| | | |
|---|---|---|
| 1,815,473 | Harding et al. | July 21, 1931 |
| 1,927,101 | Stenhouse | Sept. 19, 1933 |
| 2,041,486 | Richalet | May 19, 1936 |
| 2,387,222 | Wright | Oct. 16, 1945 |
| 2,493,260 | Paquette et al. | Jan. 3, 1950 |
| 2,600,490 | De Voe | June 17, 1952 |
| 2,616,221 | Hanson | Nov. 4, 1952 |
| 2,636,913 | Lambert | Apr. 28, 1953 |
| 2,636,914 | Arbeit | Apr. 28, 1953 |

FOREIGN PATENTS

| | | |
|---|---|---|
| 608,152 | Germany | June 16, 1935 |
| 621,282 | Great Britain | Apr. 6, 1949 |
| 65,988 | Norway | Mar. 22, 1945 |